United States Patent
Oguchi et al.

(10) Patent No.: US 9,892,320 B2
(45) Date of Patent: Feb. 13, 2018

(54) METHOD OF EXTRACTING ATTACK SCENE FROM SPORTS FOOTAGE

(71) Applicant: FUJITSU LIMITED, Kawasaki-shi, Kanagawa (JP)

(72) Inventors: Atsushi Oguchi, Kawasaki (JP); Susumu Endo, Kawasaki (JP); Takayuki Baba, Kawasaki (JP); Sokichi Fujita, Chiyoda (JP); Tatsuma Muramatsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/642,943

(22) Filed: Mar. 10, 2015

(65) Prior Publication Data

US 2015/0262015 A1   Sep. 17, 2015

(30) Foreign Application Priority Data

Mar. 17, 2014 (JP) ................. 2014-054207

(51) Int. Cl.
*G06K 9/00* (2006.01)
*G06T 7/20* (2017.01)
(Continued)

(52) U.S. Cl.
CPC .... *G06K 9/00624* (2013.01); *G06F 17/30811* (2013.01); *G06K 9/46* (2013.01);
(Continued)

(58) Field of Classification Search
None
See application file for complete search history.

(56) References Cited

U.S. PATENT DOCUMENTS 4,386,776 A * 6/1983 Bromley ............. A63F 3/00028
  200/6 A
8,005,656 B1 * 8/2011 Ankory ............... G06Q 10/04
  382/103

(Continued)

FOREIGN PATENT DOCUMENTS

EP   2 034 426 A1   3/2009
JP   2-140073        5/1990
(Continued)

OTHER PUBLICATIONS

Seo, Yongduek, et al. "Where are the ball and players? Soccer game analysis with color-based tracking and image mosaick." International Conference on Image Analysis and Processing. Springer Berlin Heidelberg, 1997.*

(Continued)

*Primary Examiner* — Vu Le
*Assistant Examiner* — Samah Beg
(74) *Attorney, Agent, or Firm* — Staas & Halsey LLP

(57) ABSTRACT

An extraction device includes a processor that executes a procedure. The procedure includes: from captured images obtained by capturing a sports game having a match style of attack toward a goal provided in territory of an opposing team, identifying a portion of captured images in which the captured images change over time toward a direction of one or other goal; and extracting a scene in which one or other team is attacking based on the portion of captured images.

10 Claims, 15 Drawing Sheets

(51) Int. Cl.
G06K 9/46 (2006.01)
G06K 9/62 (2006.01)
G06F 17/30 (2006.01)
G11B 27/034 (2006.01)
G11B 27/28 (2006.01)

(52) U.S. Cl.
CPC .............. *G06K 9/6267* (2013.01); *G06T 7/20* (2013.01); *G11B 27/034* (2013.01); *G11B 27/28* (2013.01); *G06K 2009/4666* (2013.01)

(56) References Cited

U.S. PATENT DOCUMENTS

| | | | | |
|---|---|---|---|---|
| 8,326,042 | B2* | 12/2012 | Wu | G06F 17/3079 348/700 |
| 9,186,548 | B2* | 11/2015 | House | A63B 24/0021 |
| 9,555,310 | B2* | 1/2017 | Aman | A63B 71/0669 |
| 9,646,227 | B2* | 5/2017 | Suri | G06K 9/6256 |
| 2002/0041284 | A1* | 4/2002 | Konishi | A63B 24/0003 345/473 |
| 2004/0062525 | A1* | 4/2004 | Hasegawa | G11B 27/031 386/224 |
| 2004/0130567 | A1* | 7/2004 | Ekin | A63B 24/0003 715/723 |
| 2004/0268380 | A1* | 12/2004 | Divakaran | G06K 9/00711 725/19 |
| 2005/0074161 | A1* | 4/2005 | Ancona | A63B 71/0605 382/154 |
| 2005/0195331 | A1* | 9/2005 | Sugano | G06F 17/30799 348/571 |
| 2006/0059120 | A1* | 3/2006 | Xiong | G06F 17/30787 |
| 2006/0112337 | A1* | 5/2006 | Jung | G06F 17/30787 715/723 |
| 2007/0279494 | A1* | 12/2007 | Aman | G01S 3/7864 348/169 |
| 2008/0030515 | A1* | 2/2008 | Kwon | G06K 9/00718 345/531 |
| 2008/0118153 | A1* | 5/2008 | Wu | G06K 9/00711 382/190 |
| 2008/0193016 | A1* | 8/2008 | Lim | G06F 17/30787 382/190 |
| 2008/0222678 | A1* | 9/2008 | Burke | H04N 5/76 725/44 |
| 2009/0074246 | A1* | 3/2009 | Distante | A63B 71/0605 382/103 |
| 2009/0202217 | A1 | 8/2009 | Yoshikawa et al. | |
| 2010/0002149 | A1* | 1/2010 | Ehlers | G06K 9/00711 348/699 |
| 2010/0005485 | A1* | 1/2010 | Tian | G06F 17/30787 725/32 |
| 2010/0030350 | A1* | 2/2010 | House | A63B 24/0021 700/91 |
| 2010/0278419 | A1* | 11/2010 | Suzuki | G06F 17/30787 382/155 |
| 2010/0284670 | A1* | 11/2010 | Li | G06K 9/00751 386/278 |
| 2011/0124385 | A1* | 5/2011 | Otomo | A63F 13/10 463/3 |
| 2012/0057775 | A1* | 3/2012 | Suzuki | H04N 5/76 382/154 |
| 2013/0120123 | A1* | 5/2013 | Aman | A63B 71/0669 340/323 R |
| 2013/0120581 | A1* | 5/2013 | Daniels | G06K 9/00724 348/157 |
| 2013/0130843 | A1* | 5/2013 | Burroughs | A63B 71/0686 473/415 |
| 2013/0300832 | A1* | 11/2013 | Hohteri | H04N 5/262 348/46 |
| 2013/0305156 | A1* | 11/2013 | Hohteri | G11B 27/105 715/719 |
| 2014/0093176 | A1* | 4/2014 | Maeda | G06K 9/00744 382/195 |
| 2014/0294360 | A1* | 10/2014 | Raptis | G06K 9/00335 386/239 |
| 2014/0379868 | A1* | 12/2014 | Nault | G06F 17/30165 709/219 |
| 2015/0066448 | A1* | 3/2015 | Liu | G06T 7/20 703/2 |
| 2015/0189191 | A1* | 7/2015 | Cucco | H04N 5/265 348/659 |
| 2015/0206335 | A1* | 7/2015 | Hugel | A63F 13/10 345/419 |
| 2015/0221096 | A1* | 8/2015 | Gefen | G06T 7/2093 382/103 |
| 2015/0262017 | A1* | 9/2015 | Oguchi | G06K 9/00744 382/190 |
| 2015/0262619 | A1* | 9/2015 | Oguchi | G11B 27/3081 386/241 |
| 2015/0264258 | A1* | 9/2015 | Bervoets | H04N 5/23238 348/36 |
| 2016/0096071 | A1* | 4/2016 | Ianni | A63B 24/0062 700/91 |
| 2017/0286775 | A1* | 10/2017 | Cai | G06K 9/00718 |

FOREIGN PATENT DOCUMENTS

| | | |
|---|---|---|
| JP | 2004-509529 | 3/2004 |
| JP | 2005-115607 | 4/2005 |
| JP | 2005-252860 | 9/2005 |
| JP | 2006-67343 | 3/2006 |
| JP | 2008-511186 | 4/2008 |
| JP | 2014-21150 | 2/2014 |
| JP | 2006-285878 | 10/2016 |
| WO | 02/07164 A2 | 1/2002 |
| WO | WO 02/23891 A2 | 3/2002 |
| WO | WO 02/23891 A3 | 3/2002 |
| WO | WO 2006/077806 A1 | 7/2006 |

OTHER PUBLICATIONS

Yow, Dennis, et al. "Analysis and presentation of soccer highlights from digital video." proc. ACCV. vol. 95. 1995.*

Xu, H., & Chua, T. S. (2006). Fusion of AV features and external information sources for event detection in team sports video. ACM Transactions on Multimedia Computing, Communications, and Applications (TOMM), 2(1), 44-67.*

Babaguchi, N., Kawai, Y., & Kitahashi, T. (2002). Event based indexing of broadcasted sports video by intermodal collaboration. IEEE transactions on Multimedia, 4(1), 68-75.*

Xu, H., & Chua, T. S. (Oct. 2004). The fusion of audio-visual features and external knowledge for event detection in team sports video. InProceedings of the 6th ACM SIGMM international workshop on Multimedia information retrieval (pp. 127-134). ACM.*

"Soccer Rules Simplified." The Complete Soccer Guide RSS. N.p., Jul. 28, 2012. Web. Mar. 8, 2017. <http://web.archive.org/web/20120728010508/http://www.completesoccerguide.com/soccer-rules/>.*

Beetz, M., Kirchlechner, B., & Lames, M. (2005). Computerized real-time analysis of football games. IEEE pervasive computing, 4(3), 33-39.*

Carling, C., Williams, A. M., & Reilly, T. (2005). Handbook of soccer match analysis: A systematic approach to improving performance. Psychology Press.*

Kim, K., Grundmann, M., Shamir, A., Matthews, I., Hodgins, J., & Essa, I. (Jun. 2010). Motion fields to predict play evolution in dynamic sport scenes. In Computer Vision and Pattern Recognition (CVPR), 2010 IEEE Conference on (pp. 840-847). IEEE.*

Peker, K. A., Cabasson, R., & Divakaran, A. (Jan. 2002). Rapid generation of sports video highlights using the MPEG-7 motion activity descriptor. In Storage and Retrieval for Media Databases (pp. 318-323).*

Extended European Search Report dated Jul. 29, 2015 in corresponding European Patent Application No. 15158182.4.

Gong et al., "Automatic Parsing of TV Soccer Programs", Proceedings of the International Conference on Multimedia Computing and Systems, May 15-18, 1995, pp. 167-174.

(56) References Cited

OTHER PUBLICATIONS

Chen et al., "Detection of Soccer Goal Shots Using Joint Multimedia Features and Classification Rules", Aug. 24, 2003, Retrieved from <www.cs.fiu.edu/chens/PDF/mdm03.pdf> on Aug. 25, 2005, 9 pages.
Assfalg et al., "Semantic annotation of soccer videos: automatic highlights identification", Computer Vision and Image Understanding, vol. 92, Nov. 1, 2003, pp. 285-305.
Espacenet English Abstract of Japanese Publication No. 2008-511186, Published Apr. 10, 2008.
Espacenet English Abstract of Japanese Publication No. 2005-252860, Published Sep. 15, 2005.
Espacenet English Abstract of Japanese Publication No. 2004-509529, Published Mar. 25, 2004.
Japanese Office Action dated Sep. 12, 2017 in related Japanese Application No. 2014-054207.
Japanese Office Action dated Dec. 19, 2017 in related Japanese Application No. 2014-054207.

\* cited by examiner

CAMERA MOVEMENT

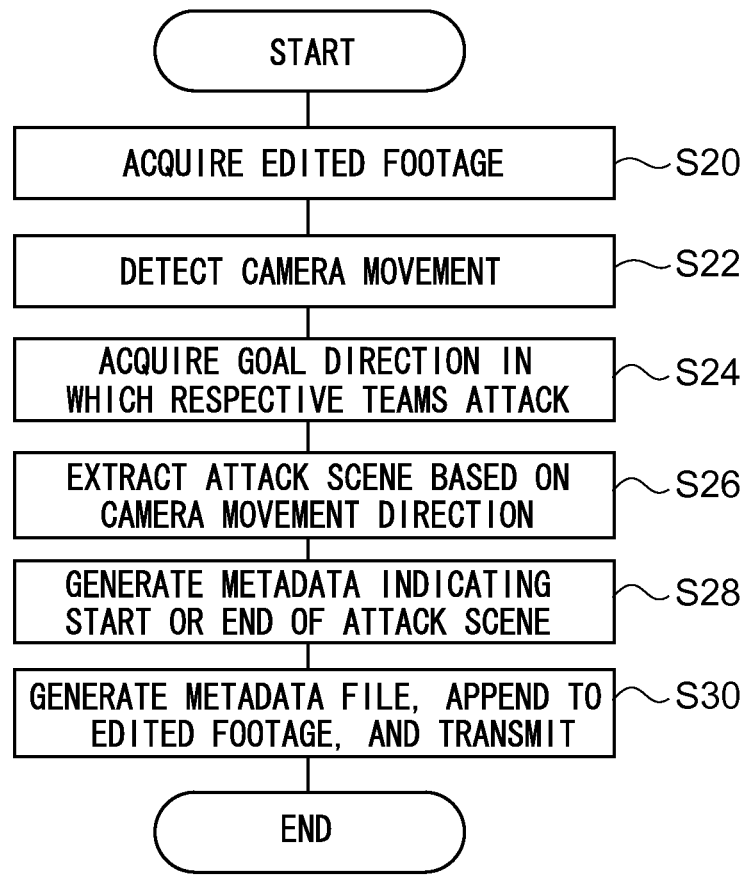
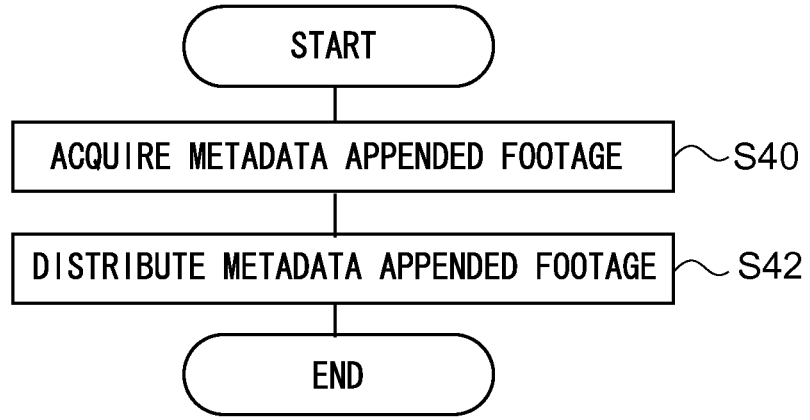

METHOD OF EXTRACTING ATTACK SCENE FROM SPORTS FOOTAGE

CROSS-REFERENCE TO RELATED APPLICATION

This application is based upon and claims the benefit of priority of the prior Japanese Patent Application No. 2014-054207, filed on Mar. 17, 2014, the entire contents of which are incorporated herein by reference.

FIELD

The embodiments discussed herein are related to a recording medium storing an extraction program, an extraction method, and an extraction device.

BACKGROUND

Hitherto, services exist that distribute captured footage of a sports game both as a live distribution, and as a distribution of Video On Demand (VOD). In such services, sometimes there are occasions when the extraction of a particular scene is desired.

For example, the identification of a scene of interest is performed when a sharp rise in sound volume is detected in audio data corresponding to footage.

There has also been a proposal to identify highlight segments in video including a frame sequence.

RELATED PATENT DOCUMENTS

Japanese National Publication of International Patent Application No. 2008-511186

SUMMARY

According to an aspect of the embodiments, a non-transitory recording medium stores an extraction program that causes a computer to execute a process. The process includes: from captured images obtained by capturing a sports game having a match style of attack toward a goal provided in territory of an opposing team, identifying a portion of captured images in which the captured images change over time toward a direction of one or other goal; and extracting a scene in which one or other team is attacking based on the portion of captured images.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a flowchart illustrating an example of extraction processing in the first exemplary embodiment;

FIG. 13 is a flowchart illustrating an example of distribution processing;

DESCRIPTION OF EMBODIMENTS

Detailed explanation follows below regarding examples of exemplary embodiments of the technology disclosed herein with reference to the drawings. In each of the exemplary embodiments below, explanation is given regarding an example in which an extraction device of the technology disclosed herein is applied to a footage distribution system that distributes captured footage of a soccer match.

First Exemplary Embodiment

Figure 1:
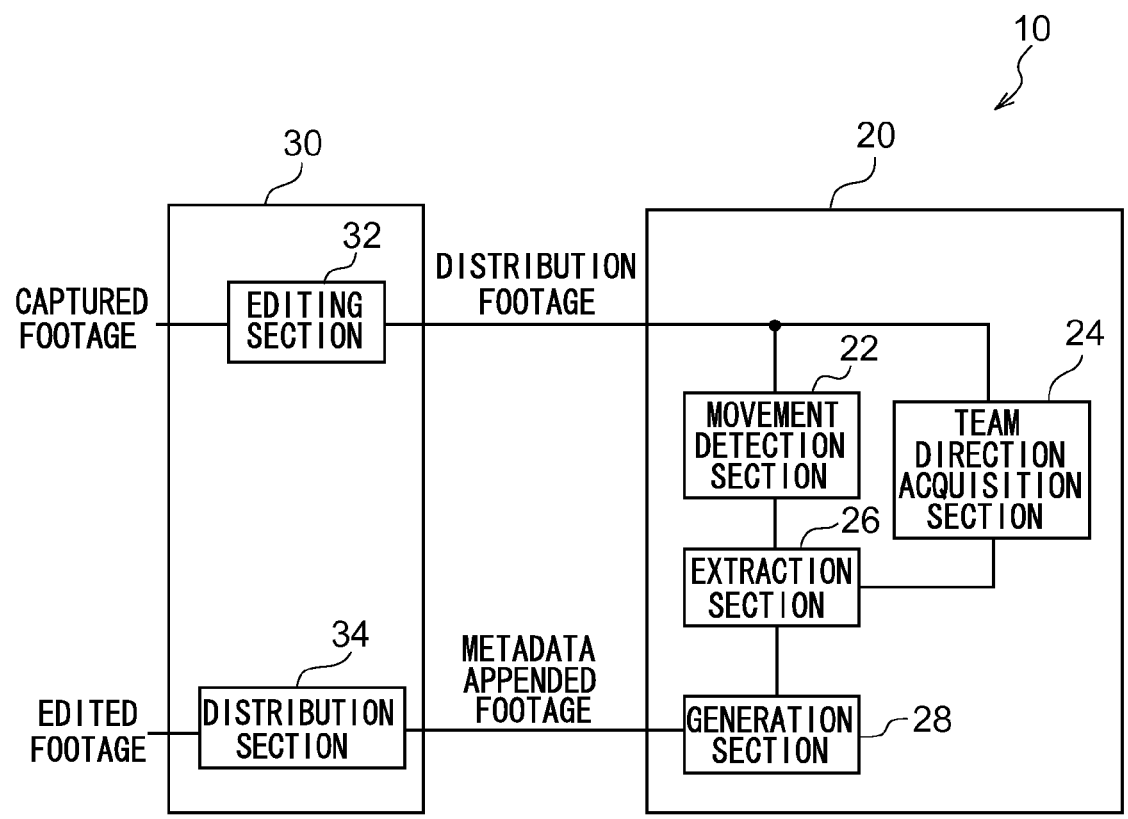
FIG. 1 is a functional block diagram illustrating a schematic configuration of a footage distribution system according to a first exemplary embodiment.

As illustrated in FIG. 1, a footage distribution system 10 according to a first exemplary embodiment includes an extraction device 20 and a distribution device 30. The extraction device 20 and the distribution device 30 are mutually connected through a network. In the footage distribution system 10, footage appended with metadata generated by the extraction device 20 is distributed through the network to a specified terminal by the distribution device 30. The extraction device 20 includes a movement detection section 22, a team direction acquisition section 24, an extraction section 26, and a generation section 28. The distribution device 30 includes an editing section 32, and a distribution section 34.

First, detailed description is given regarding each section of the distribution device 30.

The editing section 32 acquires captured footage of a soccer match (referred to as "captured footage" hereafter). Note that in the present exemplary embodiment, the footage is media including video data and audio data. The video data included in the captured footage is captured at a frame rate such as 30 fps or 60 fps, and includes plural frames. Each of the frames is associated with time data indicating the elapsed time since capture of the captured footage started. The captured footage includes audio data including audio such as cheering in the match stadium, and audio of commentators, live reports, and the like. The audio data is time sequenced data indicating a level of loudness for respective sampling points, and each sampling point is associated with time data that synchronizes with time data associated to each frame in the video data such that the audio data and the video data are synchronized.

Figure 2:
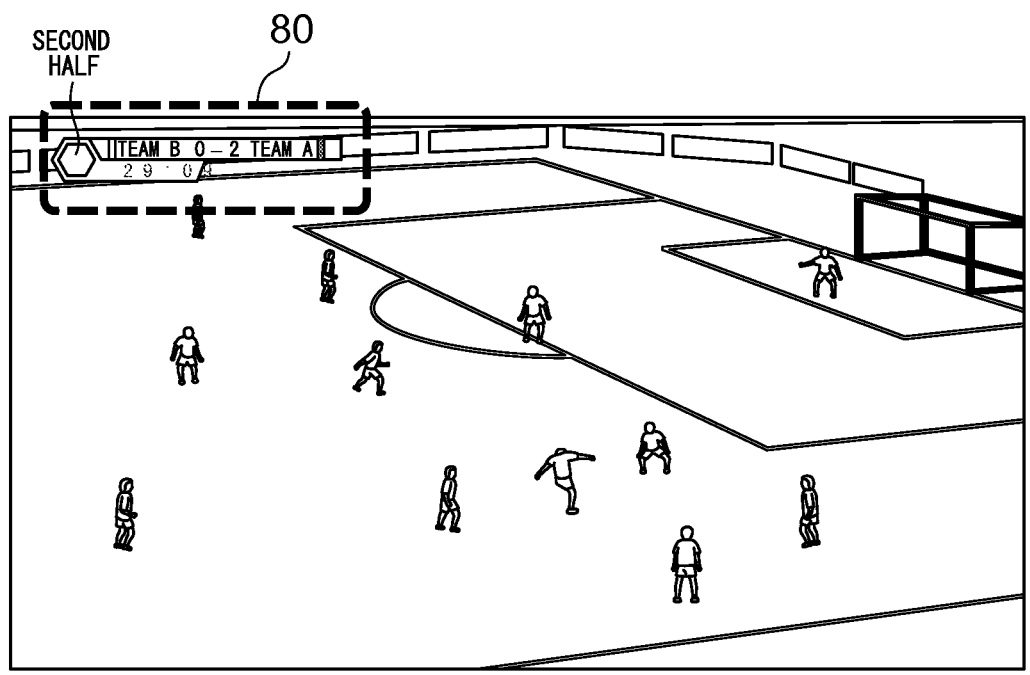
FIG. 2 is a diagram explaining an example of editing.

The editing section 32 applies editing instructions, instructed by an operation by an operator using a display device and an input device, not illustrated in the drawings, to each frame in the video data included in the captured footage using image processing. Editing instructions include, for example, adding an overlay 80 displaying a game state as illustrated in FIG. 2. Below, footage in which editing on the video data included in the captured footage has been performed by the editing section 32 is referred to as "edited footage". The editing section 32 transmits the edited footage to the extraction device 20.

The distribution section 34 acquires footage to which metadata generated by the extraction device 20 has been appended (referred to as "metadata appended footage" hereafter; detailed description given below). The metadata appended footage is converted to broadcast footage, according to specified standards, and distributed to the distribution destination terminal (omitted from illustration in the drawings) by the distribution section 34.

Next, detailed description is given regarding each section of the extraction device 20.

The movement detection section 22 acquires edited footage transmitted from the distribution device 30. The movement detection section 22 detects movement of a camera that captured the video data based on the video data included in the edited footage.

Figure 3:
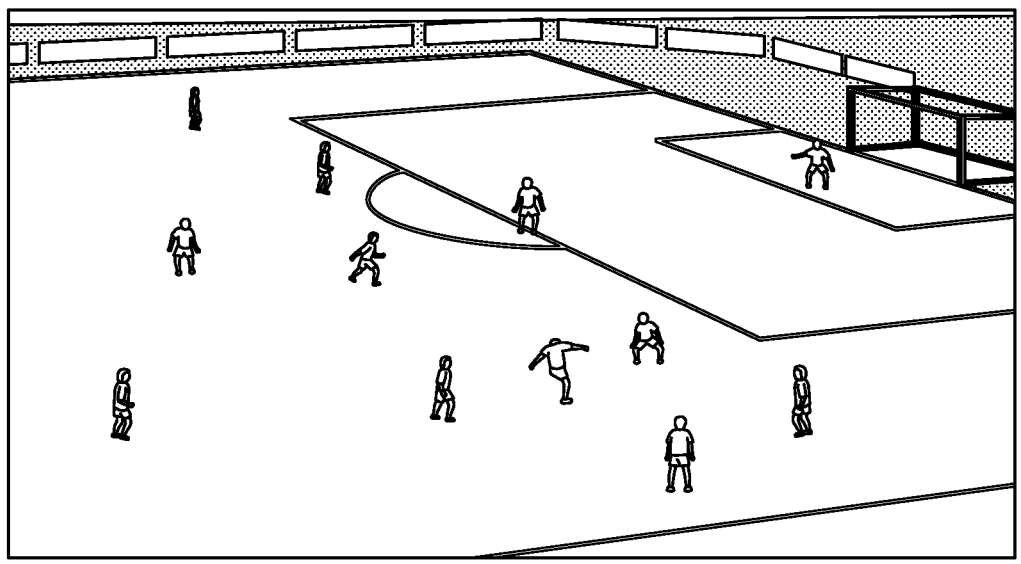
FIG. 3 is a diagram illustrating an example of a long distance frame.
Figure 4:
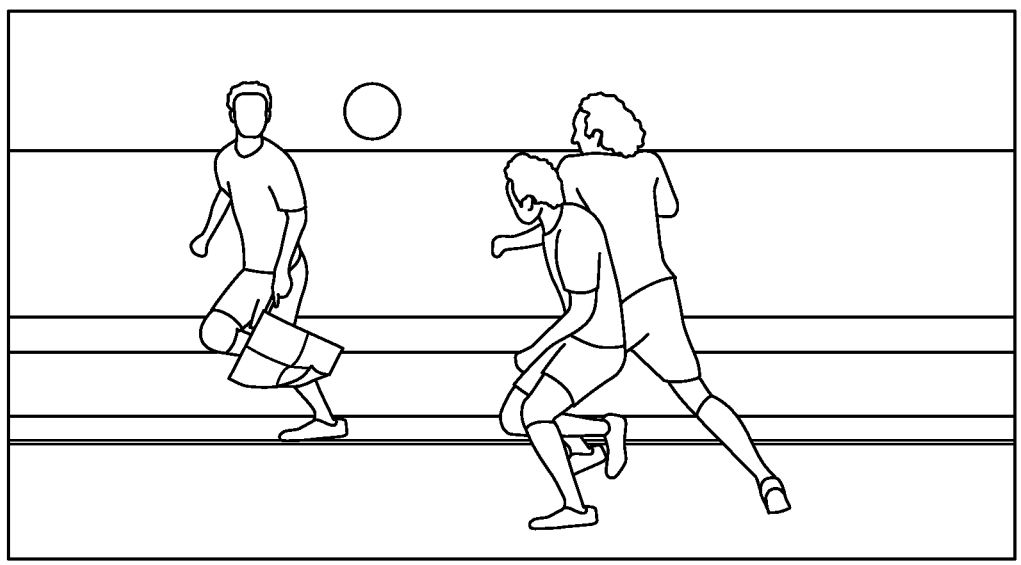
FIG. 4 is a diagram illustrating an example of a close-up frame.

Specifically, the movement detection section 22 first determines whether each respective frame is a frame captured from a long distance (referred to as a "long distance frame" hereafter), or a frame captured from a short distance (referred to as a "close-up frame" hereafter). This determination may be performed using, for example, an identification model for identifying close-up frames and long distance frames. The identification model may be generated by learning from plural long distance frames as illustrated in FIG. 3, and plural close-up frames as illustrated in FIG. 4.

Figure 5:
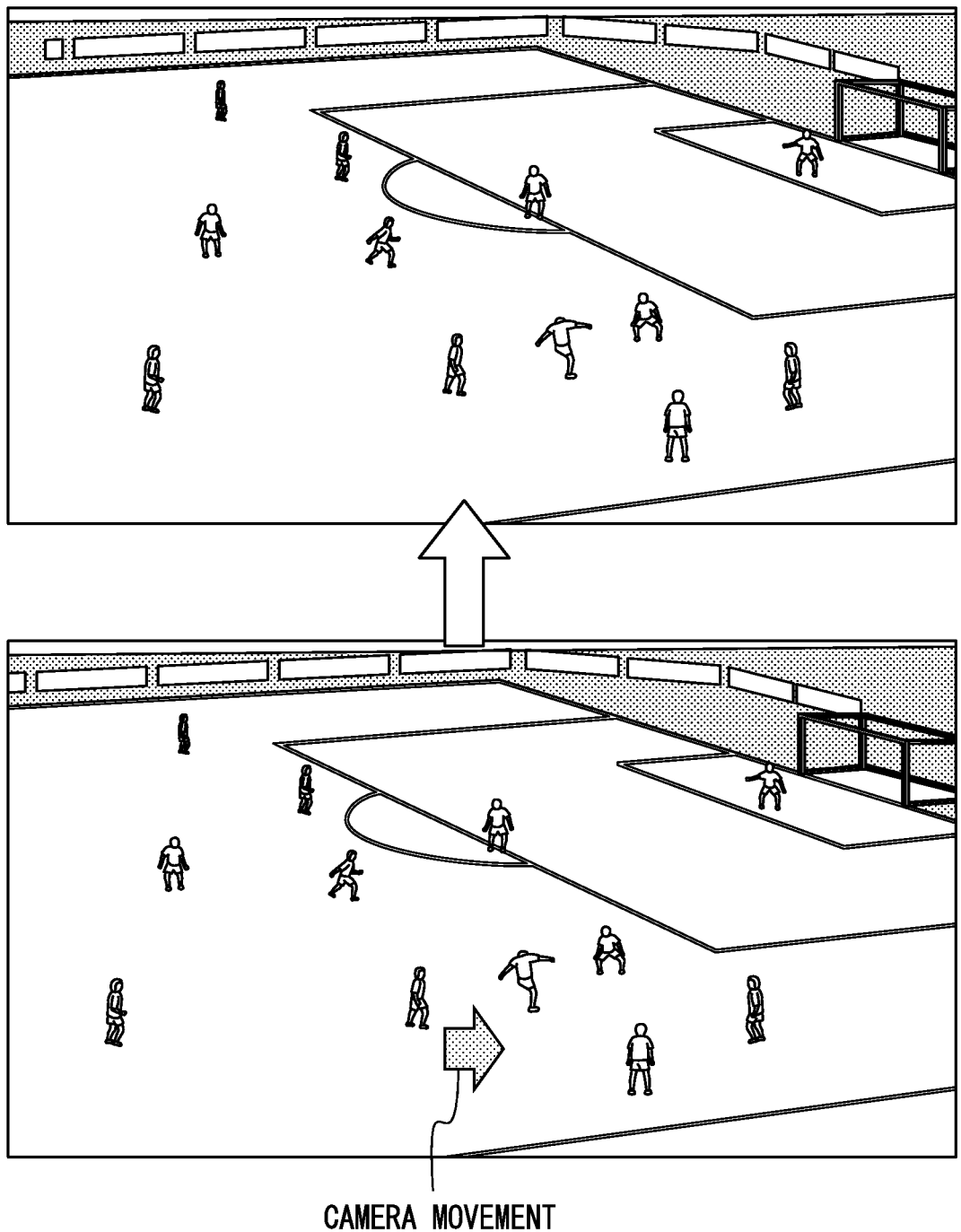
FIG. 5 is a diagram explaining camera movement.

For frames determined to be long distance frames, the movement detection section 22 causes parallel translation of data of each pixel in the frame by a specified amount of pixels worth in the horizontal direction as illustrated in FIG. 5, and derives a parallel translation amount for which there is the greatest level of overlap (degree of matching) with a prior frame. For example, taking parallel translation toward the right side of the screen as a positive direction, and parallel translation toward the left side of the screen as a negative direction, the sign of the derived parallel translation amount is the camera movement direction, and the absolute value of the amount of parallel translation is the magnitude of the movement.

Note that for simplicity of explanation, explanation is given here regarding a case in which movement of the camera in question is limited to the horizontal direction. However, similar detection may be made for vertical direction movement. Moreover, the prior frame for deriving the amount of parallel translation may be the frame one frame prior, or may be a frame a specified number of 2 or more frames prior.

The movement of the camera that actually captures the captured footage may be measured using hardware, and the measurement amount may be detected as the movement of the camera by acquisition by the movement detection section 22. For example, an encoder may be installed on a platform on which the camera is set up, and the movement of the camera measured using the encoder. In this case the movement detection section 22 may acquire the measurement amount data measured by the encoder together with the captured footage.

The team direction acquisition section 24 acquires the goal directions in which the respective teams attack for each out of a first half and a second half. For example, when the basic match data is acquired together with the edited footage, the goal directions in which the respective teams attack may be acquired based on this data. Specifically, data such as "at home: Team A vs. away: Team B" may be acquired as the basic data. In this case data such as "in the first half, the home team will attack toward the right side goal direction" may be prepared in advance and matched with the acquired basic data to acquire the goal directions in which the respective teams attack.

Figure 6:
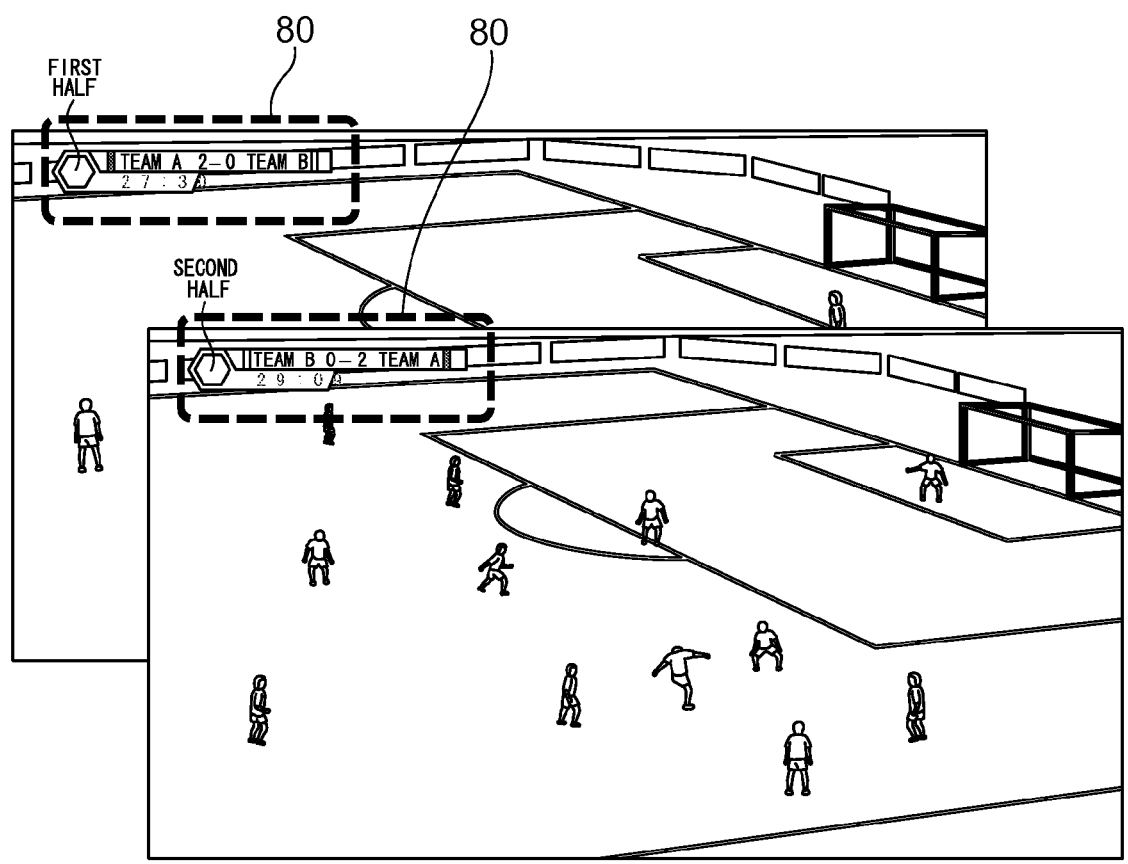
FIG. 6 is a diagram illustrating an example of an overlay displaying game states in a first half and a second half respectively.

The team direction acquisition section 24 may use data of the overlay added to the edited footage to acquire the goal directions in which the respective teams attack for each out of the first half and the second half. For example, as illustrated in FIG. 6, team names of the respective teams are aligned in the overlay 80 that displays the game state to correspond to the attaching goal directions of each of the teams for the first half and the second half respectively. For example, when Team B attacks toward the right side goal direction in the first half, as illustrated in FIG. 6, the alignment "Team A-Team B" is displayed in the overlay 80 displaying the game state. However, since Team A becomes the team attacking toward the right side goal direction in the second half, the alignment "Team B-Team A" is displayed in the overlay 80 displaying the game state.

The team direction acquisition section 24 accordingly selects a frame, out of the video data included in the acquired edited footage, to which the overlay 80 displaying the game state has been added. Then the team direction acquisition section 24 analyzes the content of the overlay 80 displaying the game state in the selected frame using a method such as pattern matching or character recognition, and acquires the goal directions in which each of the respective teams attack for the first half and the second half, respectively.

Figure 7:
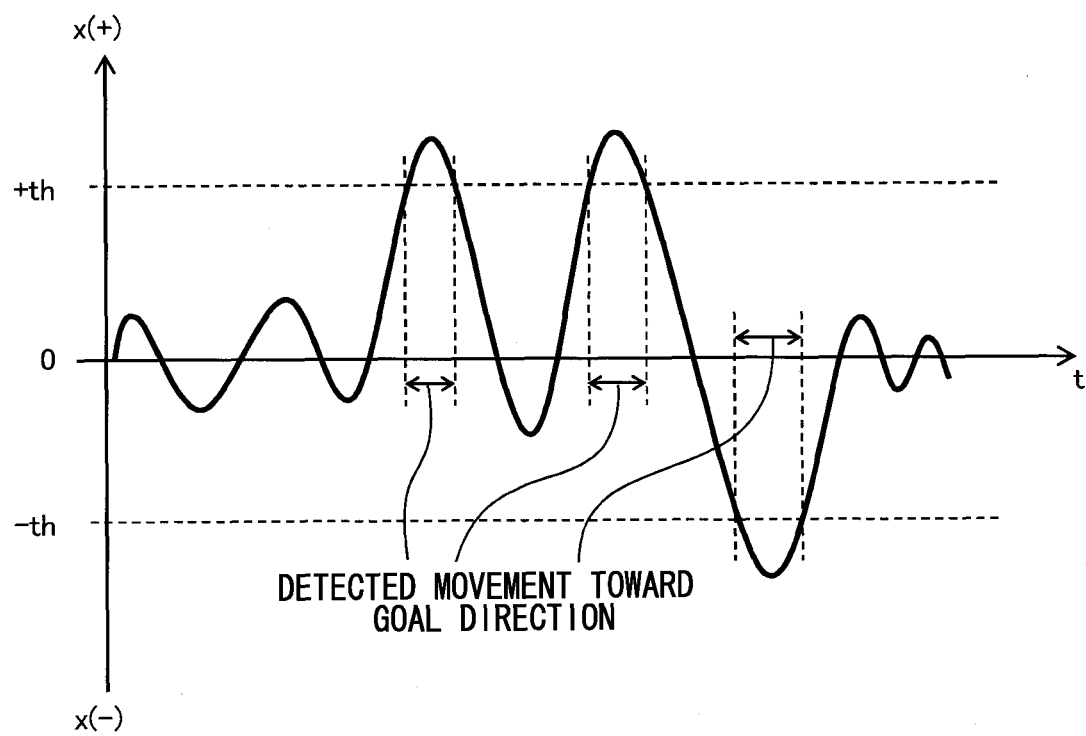
FIG. 7 is a diagram illustrating detected camera movement.

Based on the movement of the camera detected by the movement detection section 22, the extraction section 26 determines whether or not the movement is movement toward the goal direction. Movement of the camera in the goal direction can be considered as an attack toward goal by one of the teams. Specifically, the movement of the camera detected by the movement detection section 22 may be represented by a graph with time t as the x axis, and parallel translation amount x as the y axis, as illustrated in FIG. 7. The extraction section 26 is provided with respective threshold values in the positive direction and the negative direction for excluding small camera movements tracking small pass backs ("+th" and "−th" in FIG. 7). Then, the extraction section 26 determines a period in which the parallel translation amount x exceeds the positive threshold value as movement of the camera in the right side goal direction, and determines a period in which the negative threshold value is exceeded as movement of the camera in the left side goal direction.

The extraction section 26 extracts a group of frames corresponding to a timing in which movement of the camera in the right or left direction has been detected as a scene in which one of the teams attacks (referred to as an "attack scene" hereafter). For example, the extraction section 26 may extract groups of frames associated with time data corresponding to periods in which the parallel translation amount x exceeds the threshold value as groups of frames representing an attack scene, as illustrated in FIG. 7. Groups of frames associated with time data corresponding to periods including a specific number of seconds before and after the period in which the parallel translation amount x exceeds the threshold value may also be extracted as groups of frames that represent an attack scene. This enables attack scenes to be extracted that include a scene leading up to the arrival of the attack, and a scene in which the result of the attack was captured.

The extraction section 26 determines whether the attack scene represented by the extracted group of frames is a scene from the first half, or a scene from the second half of the game, based on the time data corresponding to the extracted group of frames. Then, the extraction section 26 identifies the attacking team based on the result of the determination as to whether the attack scene is from the first half or the second half, the movement direction of the camera (right or left), and the goal directions in which the respective teams attack for each of the first half and the second half acquired from the team direction acquisition section 24.

The generation section 28 generates metadata indicating the attack scene based on the group of frames extracted by the extraction section 26. Specifically, the generation section 28 generates metadata associating data indicating the start of the attack scene with time data associated with the leading frame in the extracted group of frames. The generation section 28 also generates metadata associating data indicating the end of the attack scene with time data associated with the final frame of the group of frames extracted by the extraction section 26. Data indicating the attacking team identified by the extraction section 26 is also added to the metadata.

Figure 8:
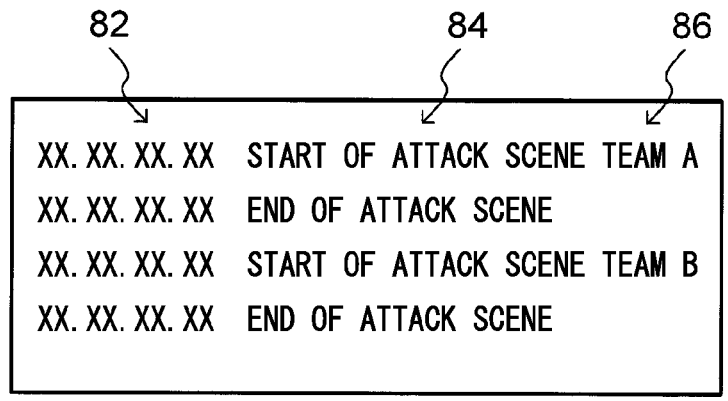
FIG. 8 is a diagram illustrating an example of a metadata file.

The generation section 28 generates a metadata file storing plural generated metadata, in the sequence of the time data contained in the metadata. The metadata file may, for example, be generated as a csv (comma-separated values) format file. FIG. 8 illustrates an example of a metadata file. One item of metadata is listed in each row in the example of FIG. 8, and each item of metadata includes time data 82, data indicating the start or end of the attack scene (reference numeral 84), and data indicating the attacking team (reference numeral 86).

Note that although explanation is given here regarding a case in which the metadata is generated using time data associated with frames, the metadata may be generated using other data that identifies each frame, such as frame numbers.

The edited footage is appended with the generated metadata file and transmitted to distribution device 30 as metadata appended footage by the generation section 28.

Figure 9:
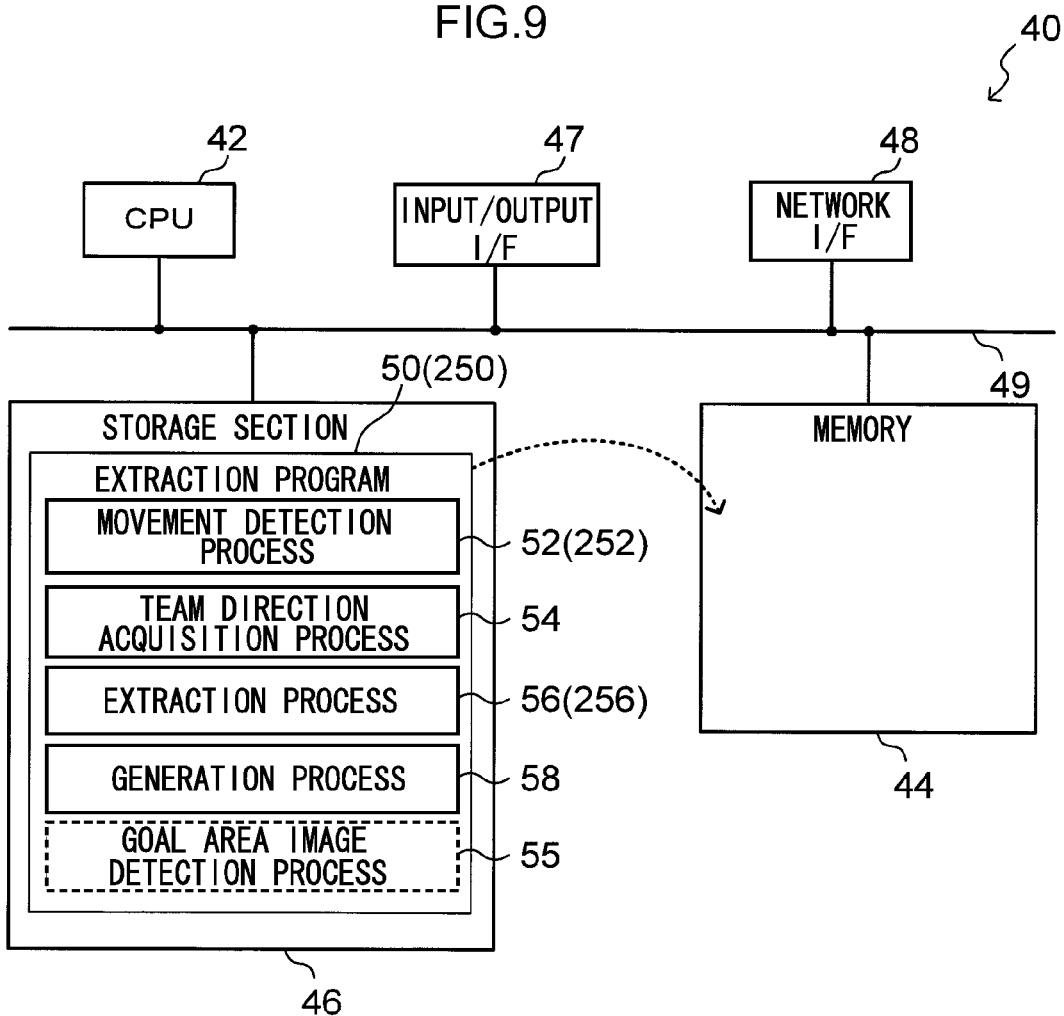
FIG. 9 is a schematic block diagram illustrating an example of computer that functions as an extraction device.

The extraction device 20 may, for example, be implemented by a computer 40 as illustrated in FIG. 9. The computer 40 includes a CPU 42, memory 44, a non-volatile storage section 46, an input/output interface (I/F) 47, and a network I/F 48. The CPU 42, the memory 44, the storage section 46, the input/output I/F 47, and the network I/F 48 are mutually connected through a bus 49.

The storage section 46 may be implemented by a hard disk drive (HDD), flash memory, or the like. An extraction program 50 that causes the computer 40 to function as the extraction device 20 is stored in the storage section 46 that serves as a recording medium. The CPU 42 reads the extraction program 50 from the storage section 46 and expands the extraction program 50 into the memory 44, and sequentially executes the processes included in the extraction program 50.

The extraction program 50 includes a movement detection process 52, a team direction acquisition process 54, an extraction process 56, and a generation process 58. The CPU 42 operates as the movement detection section 22 illustrated in FIG. 1 by executing the movement detection process 52. The CPU 42 also operates as the team direction acquisition section 24 illustrated in FIG. 1 by executing the team direction acquisition process 54. The CPU 42 also operates as the extraction section 26 illustrated in FIG. 1 by executing the extraction process 56. The CPU 42 also operates as the generation section 28 illustrated in FIG. 1 by executing the generation process 58. The computer 40 executing the extraction program 50 thereby functions as the extraction device 20.

Figure 10:
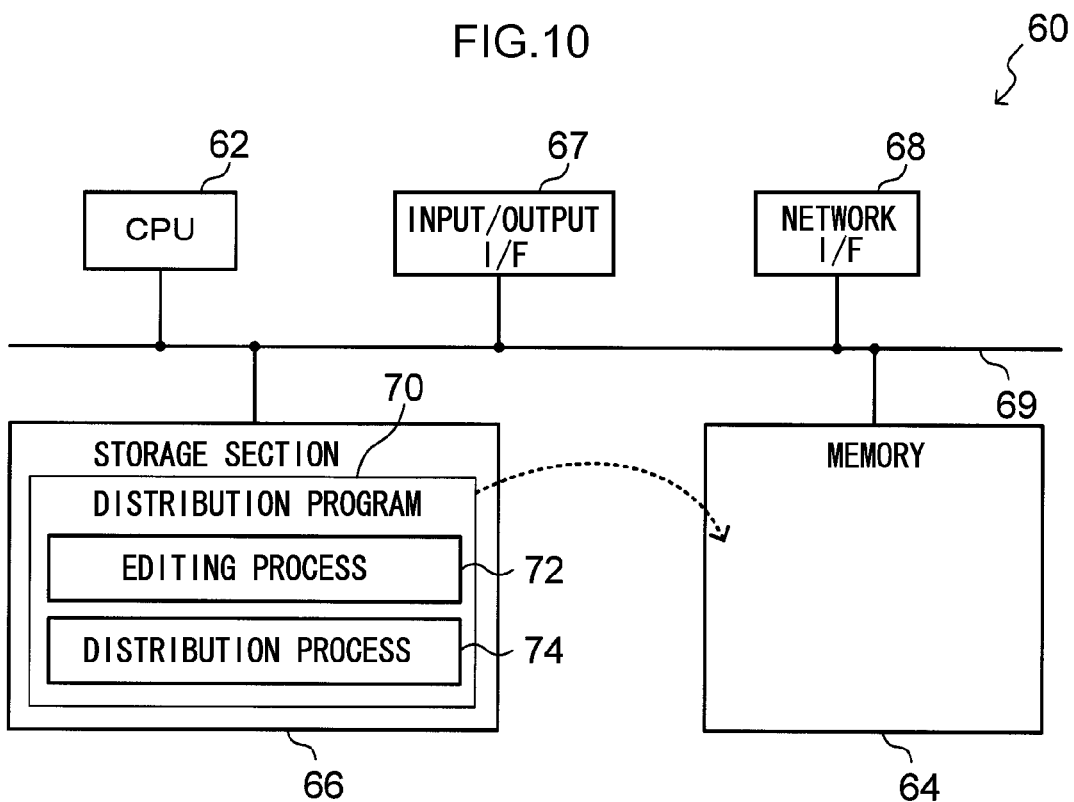
FIG. 10 is a schematic block diagram illustrating an example of a computer that functions as a distribution device.

The distribution device 30 may, for example, be implemented by the computer 60 illustrated in FIG. 10. The computer 60 includes a CPU 62, memory 64, a non-volatile storage section 66, an input/output I/F 67, and a network I/F 68. The CPU 62, the memory 64, the storage section 66, the input/output I/F 67, and the network I/F 68 are mutually connected through a bus 69. A display device and an input device, not illustrated in the drawings, are connected to the computer 60 through the input/output I/F 67.

The distribution device 30 and the extraction device 20 are connected to the network, through the network I/F 68 of the distribution device 30, and the network I/F 48 of the extraction device 20.

The storage section 66 may be implemented by a HDD, flash memory, or the like. A distribution program 70 that causes the computer 60 to function as the distribution device 30 is stored in the storage section 66 that serves as a recording medium. The CPU 62 reads the distribution program 70 from the storage section 66 and expands the distribution program 70 into the memory 64, and sequentially executes the processes included in the distribution program 70.

The distribution program 70 includes an editing process 72 and a distribution process 74. The CPU 62 operates as the editing section 32 illustrated in FIG. 1 by executing the editing process 72. The CPU 62 also operates as the distribution section 34 illustrated in FIG. 1 by executing the distribution process 74. The computer 60 executing the distribution program 70 thereby functions as the distribution device 30.

The extraction device 20 and the distribution device 30 may each be implemented by, for example, a semiconductor integrated circuit, and more specifically by an application specific integrated circuit (ASIC) or the like.

Explanation next follows regarding operation of the footage distribution system 10 according to the first exemplary embodiment. When the distribution device 30 is input with captured footage, the distribution device 30 executes editing processing illustrated in FIG. 11, and outputs edited footage. Next, when the extraction device 20 is input with the edited footage, the extraction device 20 executes extraction processing illustrated in FIG. 12, and outputs metadata appended footage. Then, when the distribution device 30 is input with the metadata appended footage, the distribution device 30 executes distribution processing illustrated in FIG. 13, and outputs distribution footage. Each type of processing is described in detail below.

Figure 11:
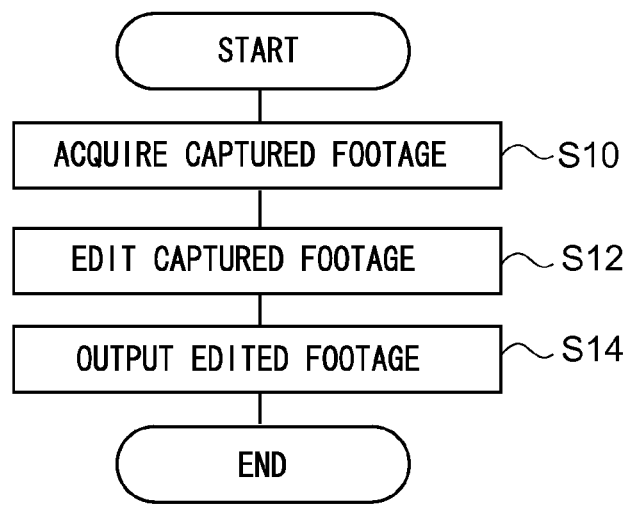
FIG. 11 is a flowchart illustrating an example of editing processing.

First, at step S10 of the editing processing illustrated in FIG. 11, the editing section 32 acquires captured footage. Next, at step S12, the editing section 32 applies editing instructions instructed by operation of an operator using the display device and the input device, not illustrated in the drawings, to each frame of the video data included in the captured footage, using image processing. Next, at step S14, the editing section 32 transmits the edited footage to the extraction device 20, and editing processing ends.

Next, at step S20 of the extraction processing illustrated in FIG. 12, the movement detection section 22 acquires the edited footage transmitted from the distribution device 30.

Next, at step S22, the movement detection section 22 determines whether each frame of the video data included in the acquired edited footage is a long distance frame, or a close-up frame. Then, for the frames determined to be long distance frames, the movement detection section 22 parallel-translates data of each pixel in the frame by specified amounts of pixel worth in the horizontal direction, and the parallel translation amount giving the greatest level of overlap with the prior frame is derived as the camera movement direction and magnitude.

Next, at step S24, based on the basic data of the game acquired together with the captured footage, the team direction acquisition section 24 acquires the goal directions in which the respective teams attack for the first half and the second half, respectively. In cases in which the basic data has not been acquired, the goal directions in which the respective teams attack is acquired for each out of the first half and the second half using data of the overlay 80 displaying the game state added to the edited footage. Note that the present step may be executed at an appropriate timing straight after the edited footage has been input to the extraction device 20, such as at the moment when a frame to which the overlay 80 displaying the game state has been added is first detected. Moreover, the present step may be executed in parallel with the processing of the prior step and the subsequent step.

Next, at step S26, based on the camera movement detected by the movement detection section 22, the extraction section 26 determines whether or not the movement indicates movement toward a goal direction. Then, the extraction section 26 extracts as an attack scene of one of the teams, a group of frames corresponding to the timing at which the camera movement toward the right or the left direction was detected. The extraction section 26 further identifies the team that is attacking based on a determination result as to whether the attack scene is from the first half or the second half, the camera movement direction (right or left), and the goal directions in which the respective teams attack for each out of the first half and the second half acquired by the team direction acquisition section 24.

Next, at step S28, the generation section 28 generates metadata associating data representing the start of the attack scene to time data associated with the leading frame of the group of frames extracted by the extraction section 26. The generation section 28 also generates metadata associating data representing the end of the attack scene to time data associated with the final frame of the group of frames extracted by the extraction section 26. The data indicating the team that is attacking, identified by the extraction section 26, is further added to the metadata.

Next, at step S30, the generation section 28 generates a metadata file storing the plural metadata generated at step S28 above in the sequence of the time data included in the metadata. The generation section 28 then appends the generated metadata file to the edited footage, and transmits the edited footage to the distribution device 30 as metadata appended footage, and extraction processing ends.

Next, at step S40 of the distribution processing illustrated in FIG. 13, the distribution section 34 acquires the metadata appended footage transmitted from the extraction device 20. Next, at step S42, the distribution section 34 converts the metadata appended footage to distribution footage according to the specified standards, and distributes the distribution footage to the distribution destination terminal (omitted from illustration in the drawings), and distribution processing ends.

As explained above, the extraction device 20 according to the first exemplary embodiment extracts as the attack scene, a group of frames corresponding to a timing at which the movement of the camera that captured the captured footage of the soccer game in the goal direction was detected. Extraction of a scene in which one of the teams is attacking is thus enabled.

Moreover, in cases in which the basic data of the game, or overlay data or the like can be employed to acquire which team is attacking in which goal direction, which team is attacking can also be identified based on the direction (right or left) in which the camera moved.

Although explanation has been given in the first exemplary embodiment of a case in which the team that is attacking is identified, the processing that is executed by the team direction acquisition section 24 may be omitted, and the attack scene extracted on its own, without identifying the team that is attacking.

Second Exemplary Embodiment

Explanation next follows regarding a second exemplary embodiment. Note that parts that are similar to those of the footage distribution system 10 according to the first exemplary embodiment are appended with the same reference numerals, and detailed explanation thereof is omitted.

Figure 14:
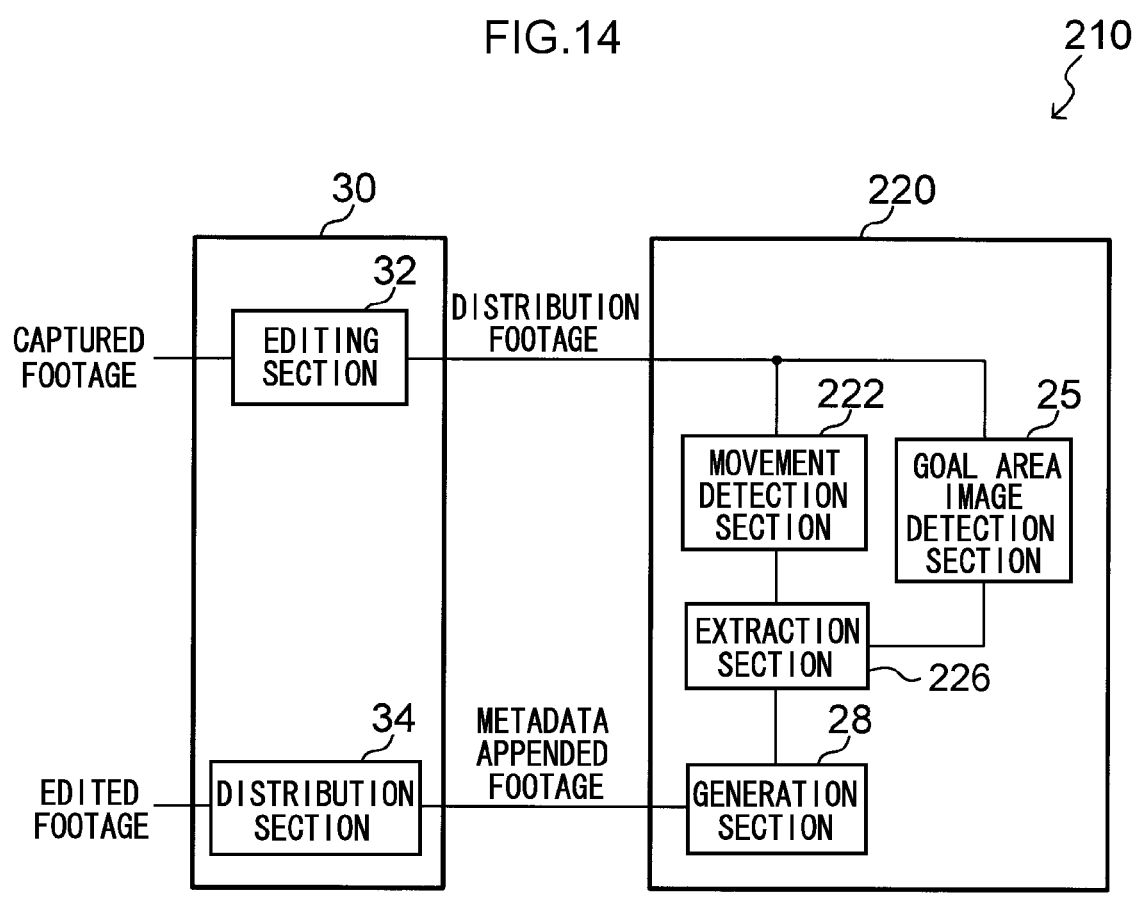
FIG. 14 is a functional block diagram illustrating a schematic configuration of a footage distribution system according to a second exemplary embodiment.

As illustrated in FIG. 14, a footage distribution system 210 according to the second exemplary embodiment includes an extraction device 220 and a distribution device 30. The extraction device 220 includes a movement detection section 222, a goal area image detection section 25, an extraction section 226, and a generation section 28.

The movement detection section 222, similarly to the movement detection section 22 of the first exemplary embodiment, determines long distance frames, and detects camera movement based on the long distance frames. The movement detection section 222 then excludes the effect of the detected camera movement, and detects player movement from inter-frame difference images. Excluding the effect of the camera movement refers to excluding static background portions appearing as moving bodies in the difference images due to the movement of the camera when the inter-frame difference images are generated.

Figure 15:
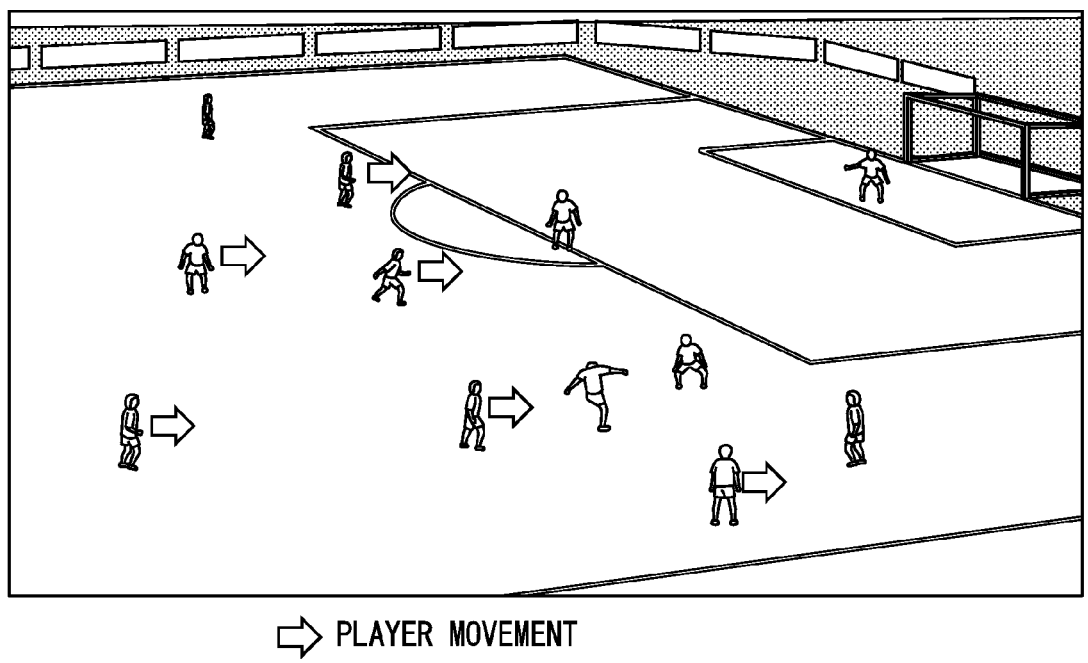
FIG. 15 is a diagram explaining player movement.

Specifically, the movement detection section 222 generates an inter-frame difference image between two frames in which data of each of the pixels in one of the frames have been parallel-translated by the amount of camera movement between the frames. Moving bodies such as the players and the ball thereby appear as small regions in the difference image. The movement direction and the movement magnitude of each of the moving bodies can be detected by making associations between each body in the difference images as illustrated in FIG. 15 for example.

Note that when generating a difference image between two frames, the difference images may be generated between consecutive frames, or, for example, a difference image may be generated between frames a specified amount of frames apart, such as every 0.5 seconds to 1 second. Since the magnitude of the camera movement between frames becomes large in the latter case, this enables a reduction in error compared to cases in which small camera movements are detected.

The goal area image detection section 25 acquires the edited footage transmitted from the distribution device 30, and detects frames representing images capturing a goal area (referred to as "goal area images" hereafter) from each frame of the video data included in the edited footage. Specifically, the goal area image detection section 25 extracts an image characteristic from each frame. The image characteristic is a characteristic represented by pixel data, such as brightness and color, of each pixel in the frame. Then, the goal area image detection section 25 derives degrees of similarity between a reference image characteristic, representing a pre-prepared goal area image, and the extracted image characteristics extracted from each frame of the edited footage. The goal area image detection section 25 detects as frames representing goal area images frames with an extracted image characteristic having a degree of similarity to the reference image characteristic that is a specified value or above.

Figure 16:
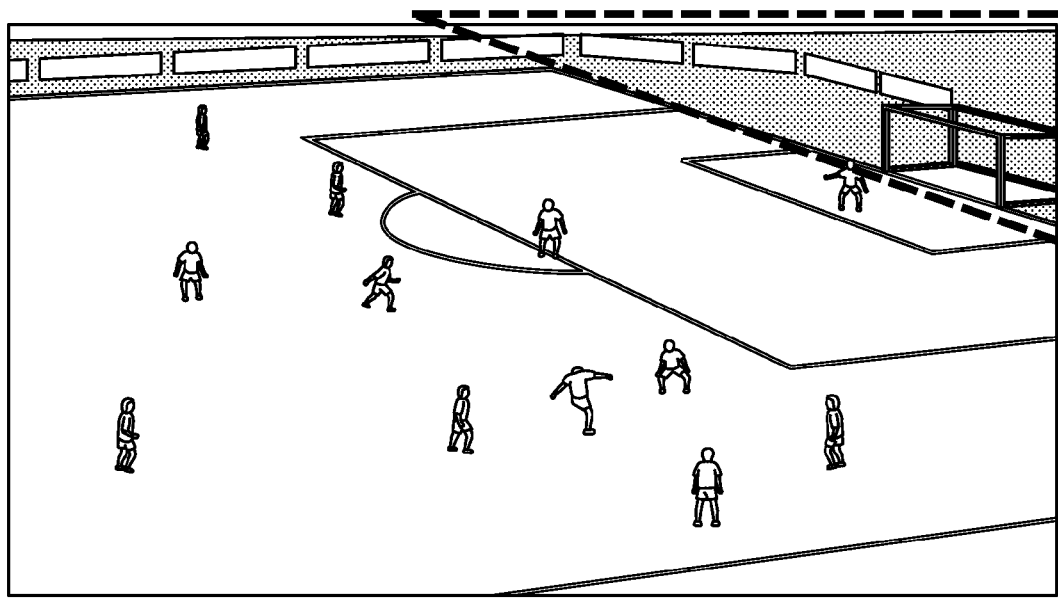
FIG. 16 is a diagram illustrating an example of a goal area image.

More specifically, the goal area image is, for example, an image such as that illustrated in FIG. 16, and has a characteristic such as a goal post being present in a portion of the image and there being a group of pixels of a color different from the color of the pitch in a corner portion of the image (inside the dashed line in FIG. 16). Accordingly, the goal area image detection section 25, for example, excludes pixels representing the color of the pitch (green) based on color data of the pixels in each of the frames. Moreover, pixels are grouped based on color data, and small regions in which the number of pixels included in the group is a specific number or fewer, are excluded as regions representing players. Then, the frame is detected as a goal area image in cases in which a characteristic represented by a position and shape of the remaining regions and colors of the pixels included in the remaining regions indicate, for example, a characteristic of a group of pixels of a color different from the color of the pitch in a corner portion of the image, as illustrated inside the dashed line in FIG. 16.

Figure 17:
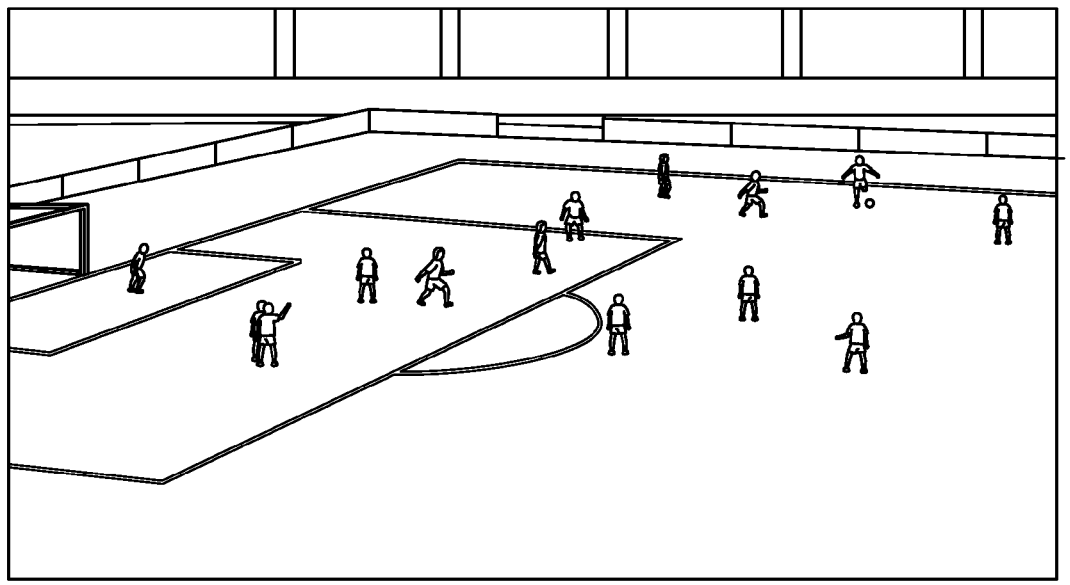
FIG. 17 is a diagram illustrating an example of a goal area image.

The goal area image detection section 25 may determine whether or not each frame is a goal area image by pattern matching of the shape of a goal post, a line in front of the goal post, or the like. Although FIG. 16 illustrates a goal area image representing the goal area at the right side of the screen, goal area images representing the goal area at the left side of the screen, as illustrated in FIG. 17, are detected similarly.

As the image characteristic, the goal area image detection section 25 may employ a characteristic representing an image structure (composition), a characteristic representing a placement or distribution of, for example, color and brightness, a characteristic obtained by wavelet conversion, or the like. In cases in which such an image characteristic is extracted, it may be extracted from the entirety of each frame, or the characteristic may be extracted from a portion of each frame.

Based on the player movement detected by the movement detection section 222, the extraction section 226 determines whether or not that movement represents movement in a goal direction. A player moving in a goal direction can be considered as an indication that one of the teams is attacking toward a goal. Specifically, as illustrated in FIG. 7, the player movement detected by the movement detection section 222 can be represented by a graph the time t as the x axis, and the horizontal direction translation amount x as the y axis, similarly to the camera movement in the first exemplary embodiment. In the present exemplary embodiment, attention is given to the amount of translation in the horizontal direction in the detected player movements, since player movement in a goal direction is important data. Note that the translation amount in the vertical direction may be used in combination. Since horizontal direction translation amounts are obtained for each of the plural players, a single horizontal direction translation amount is derived for each team using an average of all of the obtained horizontal direction translation amounts, or the like.

The extraction section 26 is provided with a threshold value for each out of the positive direction and the negative direction ("+th" and "−th" in FIG. 7) in order to exclude small player movements due to small pass backs. Then, the extraction section 226 determines periods in which the horizontal direction translation amount x exceeds the positive threshold value as player movement in the right side goal direction, and determines periods in which the negative threshold value is exceeded as player movement in the left side goal direction. The extraction section 226 then extracts as an attack scene candidate a group of frames corresponding to a timing at which player movement in the right or left direction was detected.

Figure 18:
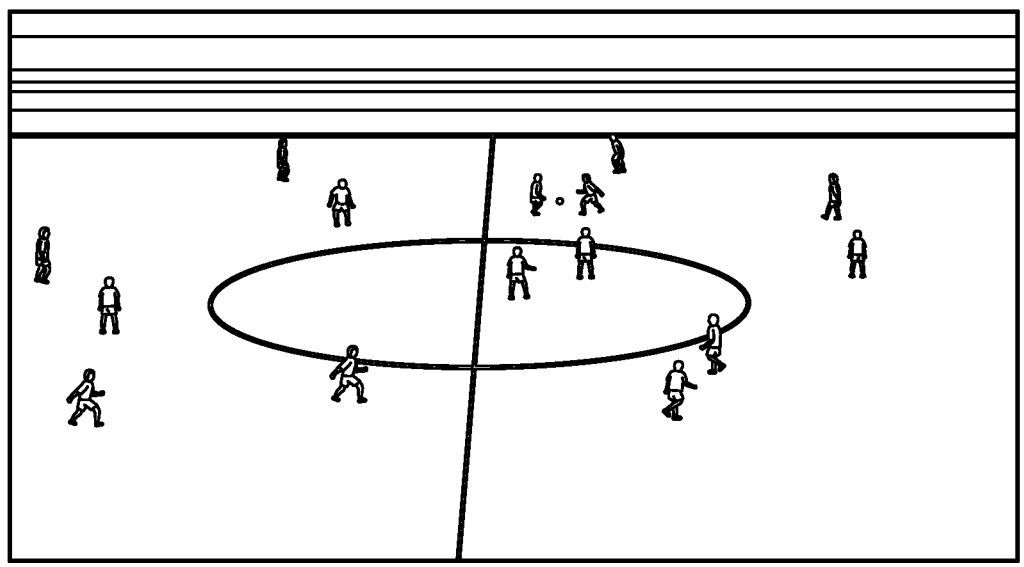
FIG. 18 is a diagram illustrating an example of an image other than a goal area image.

Here, as illustrated in FIG. 16 and FIG. 17, images in attack scenes are generally goal area images. For example, as illustrated in FIG. 18, times when images are of the central area of the pitch, can be considered to be scenes in which neither of the teams are attacking in a goal direction. Namely, even when player movement in a goal direction is detected, determination that that scene is not an attack scene is enabled in cases in which a goal area image is not included in the group of frames corresponding to that timing.

Thus the extraction section 226 determines whether or not frames detected as goal area images by the goal area image detection section 25 are included in at least a portion of the group of frames extracted as an attack scene candidate. The extraction section 226 extracts the attack scene candidate as an attack scene in cases in which a goal area image is included therein. The extraction section 226 may also extract as an attack scene a group of frames in which the extracted goal direction in the goal area image matches the player movement direction out of the groups of frames with goal area images extracted as attack scene candidates. Specifically, for example, a group of frames including a goal area image representing the goal area on the right side of the screen as the goal area image, and in which player movement in the right side goal direction is detected, may be extracted as an attack scene. A group of frames including a goal area image representing the goal area on the left side of the screen as the goal area image, and in which player movement in the right side goal direction is detected, may be excluded from the attack scenes. In cases in which the extracted goal direction of the goal area image and the player movement direction do not match, the attack scene candidate can, for example, be considered to be a scene of a goal kick, or a scene in which a defender clears the ball. Attack scene candidates in which the extracted goal direction of the goal area image and the player movement direction do not match are excluded from the attack scenes. This enables the detection as an attack scene of scenes of goal kicks, and scenes in which a defender clears the ball, to be suppressed.

The extraction device 220 may be implemented by, for example, the computer 40 illustrated in FIG. 9, similarly to in the first exemplary embodiment. An extraction program 250 that causes the computer 40 to function as the extraction device 220 is stored in the storage section 46 serving as a recording medium. The CPU 42 reads the extraction program 250 from the storage section 46, expands the extraction program 250 into the memory 44, and sequentially executes the processes included in the extraction program 250.

The extraction program 250 includes a movement detection process 252, a goal area image detection process 55, an extraction process 256, and the generation process 58. The CPU 42 operates as the movement detection section 222 illustrated in FIG. 14 by executing the movement detection process 252. The CPU 42 also operates as the goal area image detection section 25 illustrated in FIG. 14 by executing the goal area image detection process 55. The CPU 42 also operates as the extraction section 226 illustrated in FIG. 14 by executing the extraction process 256. The generation process 58 is similar to that of the first exemplary embodiment. The computer 40 executing the extraction program 250 thereby functions as the extraction device 220.

Explanation next follows regarding the operation of the footage distribution system 210 according to the second exemplary embodiment. In the second exemplary embodiment, since only the extraction processing executed by the extraction device 220 is different from the first exemplary embodiment, explanation follows regarding the extraction processing in the second exemplary embodiment with reference to FIG. 19. Note that processing similar to the extraction processing of the first exemplary embodiment is appended with the same reference numerals and detailed explanation thereof is omitted.

Figure 19:
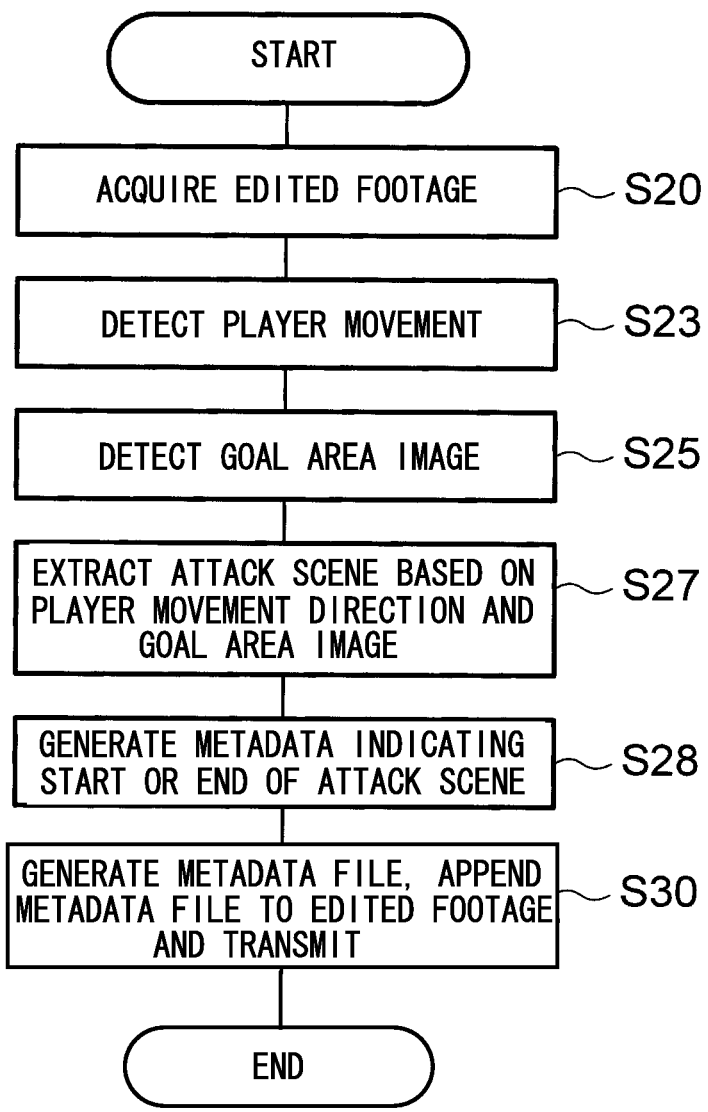
FIG. 19 is a flowchart illustrating an example of extraction processing in the second exemplary embodiment.

At step S23 of the extraction processing illustrated in FIG. 19, the movement detection section 222 determines long distance frames based on the video data included in the edited footage, and detects camera movement based on the long distance frames. Then, the movement detection section 222 excludes the effect of the detected camera movement and detects player movement from inter-frame difference images.

Next, at step S25, the goal area image detection section 25 extracts an image characteristic for each frame of the video data, and extracts frames representing a goal area image by comparison with a reference image characteristic representing a pre-prepared goal area image.

Next, at step S27, the extraction section 226 extracts as an attack scene candidate a group of frames corresponding to a timing at which player movement was detected in the right or the left direction by the movement detection section 222. Then, the extraction section 226 determines whether or not frames detected as goal area images by the goal area image detection section 25 are included in at least a portion of the group of frames extracted as the attack scene candidate. In cases in which a goal area image is included, the extraction section 226 extracts that attack scene candidate as an attack scene.

Subsequent processing is performed similarly to the extraction processing of the first exemplary embodiment, and the extraction processing ends.

As explained above, according to the extraction device 220 according to the second exemplary embodiment, a group of frames corresponding to a timing at which player movement in a goal direction was detected is extracted as an attack scene from captured footage of a soccer game. Extraction of a scene in which one of the teams is attacking is thus enabled.

Moreover, also employing a goal area image detection result in the attack scene extraction enables extraction of scenes that are not attack scenes, based on movement of players in midfield defending or the like, to be prevented.

Note that although explanation has been given of a case in which player movement is detected in the second exemplary embodiment, ball movement may be detected using a similar method. Detection of ball movement is enabled based on shape and color data of moving bodies detected using difference images.

Moreover, the team direction acquisition section 24 of the first exemplary embodiment may be provided, and identification of the attacking team may be performed in the second exemplary embodiment also.

Moreover, the goal area image detection section 25 of the second exemplary embodiment may be provided, and a goal area image detection result may also be employed in the attack scene extraction in the first exemplary embodiment also.

In each of the exemplary embodiments above, easy location of a desired attack scene of sports game footage (the captured footage, or the edited footage) based on metadata is enabled when employing metadata appended footage, to which the metadata indicating the attack scene extracted is appended. Moreover during footage distribution, for example, a supplementary service, such as transmission of email to a user, may be performed automatically coordinated with attack scenes based on the metadata.

Note that although explanation has been given regarding cases in which attack scenes are extracted based on video data in each of the above exemplary embodiments, audio data corresponding to the video data may also be employed in order to identify attack scenes. For example, scenes of interest may be extracted based on the audio data, and when camera or player movement in a goal direction is detected that is also a scene of interest, that scene may be extracted as an attack scene.

Specifically, a sound change detection section may be provided, and changes calculated in the sound volume level of the audio data included in the edited footage. For example, the difference or ratio of an average value of the sound volume level at respective sampling points included in a specific interval, and the average value of the sound volume level at respective sampling points included in a specific interval immediately before, may be calculated as the sound volume change amount. The sound change detection section then detects as start points, points in time (sampling points) at which the calculated amount of change in the sound volume exceeds a predetermined change amount threshold value $th_c$.

For example, the volume of cheering and the like usually rises suddenly in the game stadium at the start time of scenes of interest such as goal scenes, foul scenes, scenes in which defense switches to attack such as at a successful intercept or the like, and disappointed near miss scenes. Accordingly, an interval short enough that sudden changes to the sound volume level can be captured is set as the specific interval when calculating sound volume level changes. The change amount threshold value $th_c$ is preset based on the amount of sound volume level change in audio data corresponding to scenes of interest in past game footage.

Figure 20:
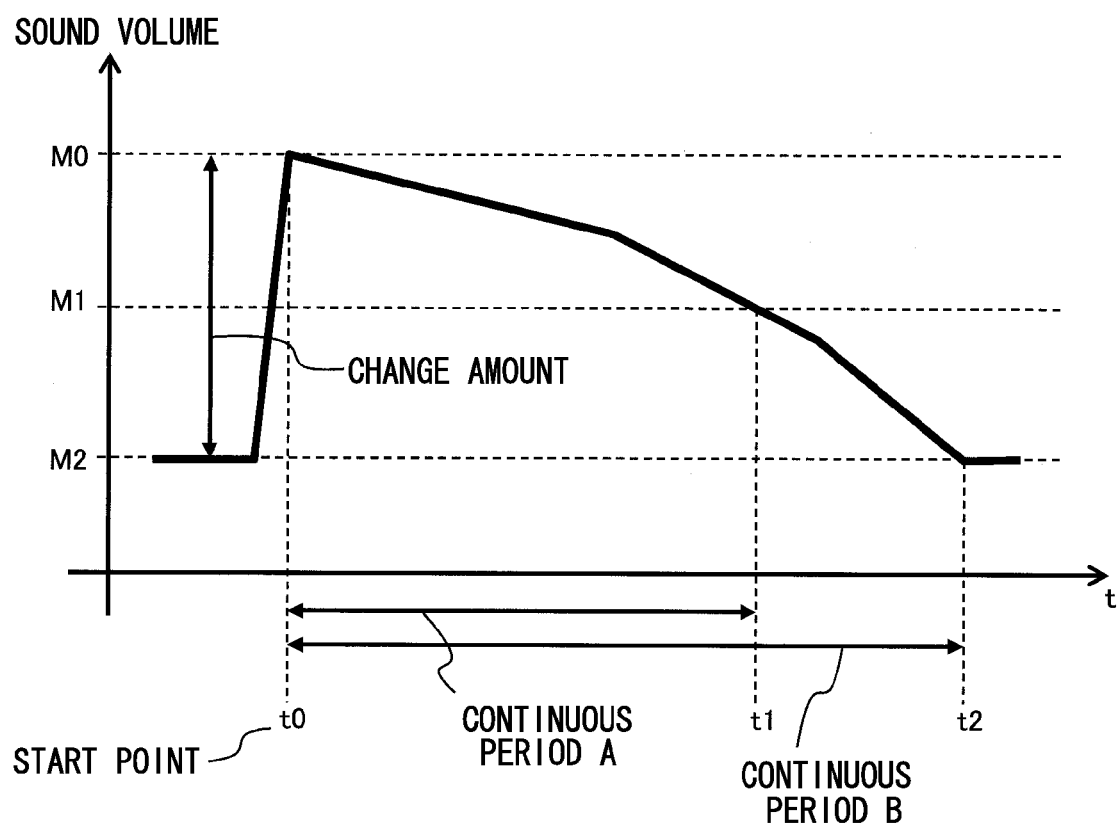
FIG. 20 is a diagram explaining a continuous period.

The extraction section 26 (or 226) determines a continuous period in which the sound volume is continually a specific level or greater from a start point detected by the sound change detection section. The volume of the cheering or the like tends to be continuous for a specific period or longer after suddenly rising in scenes of interest. Accordingly, the continuous interval, at which the sound volume is the specific level or greater, is determined such that such a trend can be captured. The specific level for identification of the continuous period may, as illustrated in FIG. 20 for example, be a level M1 that is a specific percentage (for example 50%) of a level M0 of the sound volume at a start point t0. In this case, the extraction section 26 identifies a period from the start point t0 until a point t1 at which the level of the sound volume became less than M1 as the continuous period (continuous period A in FIG. 20). As another example, as illustrated in FIG. 20 for example, the specific level may be a level M2 of the sound volume immediately before the start point t0, namely, before the sudden rise in the sound volume. In this case, the extraction section 26 identifies as the continuous period a period from the start point t0 until a point t2 at which the level of the sound volume becomes less than M2 (continuous period B in FIG. 20).

The extraction section 26 (or 226) compares the identified continuous period against a preset continuous period threshold value $th_t$. In cases in which the continuous period is the continuous period threshold value $th_t$ or greater, the extraction section 26 (or the 226) extracts a frame of the video data corresponding to the start point detected by the sound change detection section as a starting frame of a scene of interest. The extraction section 26 (or 226) extracts as an attack scene candidate a group of frames corresponding to a timing at which movement of the camera or the players in a goal direction was detected. The extraction section 26 (or 226) then extracts that attack scene candidate as an attack scene when a least a portion of the frames of the attack scene candidate are also extracted as a scene of interest. This thereby enables extraction of scenes of back passes and the like as attack scenes to be prevented.

Although explanation has been given in which soccer is the target sport in each of the exemplary embodiments above, there is no limitation thereto. For example, technology disclosed herein may be applied to any sport, such as rugby or American football, having a match structure with attack towards a goal provided in territory of an opposing team.

Although explanation has been given of examples in which a footage distribution system includes a distribution device and an extraction device in each of the exemplary embodiments above, there is no limitation thereto. Each of the functional sections of the distribution device, and each of the functional sections of the extraction device may be implemented by a single computer.

Although explanation has been given of cases in which footage appended with metadata, generated by the extraction device, indicating attack scenes is distributed by the distribution device in each of the exemplary embodiments above, there is no limitation thereto. For example, metadata appended footage may be saved as a large volume archive, and the desired attack scenes alone extracted and output based on the metadata.

The output from the extraction device may also be employed in applications other than footage distribution systems.

Although explanation has been given above of modes in which the extraction programs 50 and 250 are pre-stored (installed) on the storage section 46, and the distribution program 70 is pre-stored (installed) on the non-volatile storage section 66, they may be provided in a format recorded on a recording medium such as a CD-ROM or a DVD-ROM.

One aspect exhibits the advantageous effect of enabling extraction of scenes of one of the teams attacking from captured footage of a sports game.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the technology disclosed herein have been described in detail, it should be understood that the various changes, substitutions, and alterations could be made hereto without departing from the spirit and scope of the invention.

What is claimed is:

1. A non-transitory recording medium storing an extraction program that causes a computer to execute a process, the process comprising:
   based on captured images obtained by capturing a sports game having a match style of attack toward a goal provided in a territory of an opposing team, identifying captured images corresponding to a period in which a parallel translation amount exceeds a predetermined threshold, wherein the parallel translation amount is calculated as an average of horizontal translation amounts derived for each of a plurality of imaging subjects included in the captured images moving toward the goal, based on inter-frame pixel differences;
   acquiring predetermined information that indicates the directions of the goals in which respective teams attack based on a game time of the captured sports game;
   extracting a scene in which a team is attacking based on the direction of the goal and a direction of movement of imaging subjects derived from the identified captured images, wherein the extracting is performed by comparing the calculated parallel translation amount to a positive or a negative threshold which respectively indicate a direction of movement of the imaging subject towards the goal or another goal;
   identifying the attacking team based on the direction of the goal, the direction of movement of the imaging subjects, and the acquired predetermined information;
   generating a video file based on the extracted scene;
   indicating the generated video file is of the identified attacking team; and
   transmitting the generated video file to a distribution device,
   wherein the extracted scene includes a group of the identified captured images.

2. The non-transitory recording medium of claim 1, the process further comprising:
   detecting a frame capturing a goal area from each of a plurality of frames included in the captured images, wherein
   when extracting the scene in which the team is attacking, in cases in which the frame capturing the goal area is included in a group of frames corresponding to a timing at which movement toward the direction of a goal or another of the goals was detected, the group of frames is extracted as the scene in which the team is attacking.

3. The non-transitory recording medium of claim 2, wherein, in the process, when extracting the scene in which the team is attacking, a group of frames in which a direction of movement toward the direction of a goal or another of the goals, and a detection direction of the goal area in the frame capturing the goal area, match each other is extracted as the scene in which the team is attacking.

4. The non-transitory recording medium of claim 2, wherein in the process, the extraction of the scene in which the team is attacking is performed by detecting, as the frame capturing the goal area, a frame in which an image characteristic extracted from the frame resembles a characteristic predetermined as a characteristic of a frame capturing the goal area.

5. The non-transitory recording medium of claim 1, wherein in the process, a leading frame of a group of frames corresponding to a timing at which movement toward the direction of a goal or another of the goals was detected is set as a frame associated with time data of a specific number of seconds before the timing.

6. The non-transitory recording medium of claim 1, wherein the acquired predetermined information further indicates the direction of the goal in which the respective teams attack in a first half and a second half.

7. A non-transitory recording medium storing an extraction program that causes a computer to execute a process, the process comprising:

based on historical data of movement during image capture by a camera that has captured a sports game having a match style of attack toward a goal provided in a territory of an opposing team, identifying captured images corresponding to a period in which a parallel translation amount exceeds a predetermined threshold, wherein the parallel translation amount is calculated as an average of horizontal translation amounts derived for each of a plurality of imaging subjects included in the captured images moving toward the goal, based on inter-frame pixel differences; and acquiring predetermined information that indicates the directions of the goals in which respective teams attack based on a game time of the captured sports game;

extracting a scene in which a team is attacking based on the direction of the goal and a direction of movement of imaging subjects derived from the identified captured images, wherein the extracting is performed by comparing the calculated parallel translation amount to a positive or a negative threshold which respectively indicate a direction of movement of the imaging subject towards the goal or another goal;

identifying the attacking team based on the direction of the goal, the direction of movement of the imaging subjects, and the acquired predetermined information;

generating a video file based on the extracted scene;

indicating the generated video file is of the identified attacking team; and transmitting the generated video file to a distribution device, wherein the extracted scene includes a group of the identified captured images.

8. A non-transitory recording medium storing an extraction program that causes a computer to execute a process, the process comprising:

based on captured images obtained by capturing a sports game having a match style of attack toward a goal provided in a territory of an opposing team, identifying captured images corresponding to a period in which a parallel translation amount exceeds a predetermined threshold, wherein the parallel translation amount is calculated as an average of horizontal translation amounts derived for each of a plurality of imaging subjects included in the captured images moving toward the goal, based on inter-frame pixel differences; and acquiring predetermined information that indicates the directions of the goals in which respective teams attack based on a game time of the captured sports game;

extracting a scene in which a team is attacking based on the direction of the goal and a direction of movement of an imaging subject derived from the identified captured images, wherein the extracting is performed by comparing the calculated parallel translation amount to a positive or a negative threshold which respectively indicate a direction of movement of the imaging subject towards the goal or another goal;

identifying the attacking team based on the direction of the goal, the direction of movement of the imaging subject, and the acquired predetermined information;

generating a video file based on the extracted scene;

indicating the generated video file is of the identified attacking team; and transmitting the generated video file to a distribution device, wherein the extracted scene includes a group of the identified captured images.

9. The non-transitory recording medium of claim 8, wherein in the process, the imaging subject is one player or a plurality of players in the sports game, or a ball used in the sports game, or both.

10. The non-transitory recording medium of claim 9, wherein in the process, an effect of movement of a camera that has captured the game is excluded and the imaging subject is detected.

* * * * *